United States Patent [19]
Werle et al.

[11] Patent Number: 5,560,833
[45] Date of Patent: Oct. 1, 1996

[54] METHOD FOR TREATING WATER WITH ACROLEIN AND A DEVICE FOR THE PERFORMANCE THEREOF

[75] Inventors: Peter Werle, Gelnhausen; Bernd Geissler, Gross-Umstadt; Martin Trageser, Gelnhausen, all of Germany

[73] Assignee: Degussa Aktiengesellschaft, Frankfurt, Germany

[21] Appl. No.: 280,881

[22] Filed: Jul. 27, 1994

[30] Foreign Application Priority Data

Aug. 7, 1993 [DE] Germany ............... 43 26 575.8

[51] Int. Cl.⁶ .................................................. C02F 1/50
[52] U.S. Cl. ................. 210/749; 210/764; 422/36; 568/449; 568/491
[58] Field of Search ........................... 210/749, 764; 422/36; 568/449, 491

[56] References Cited

U.S. PATENT DOCUMENTS

| | | |
|---|---|---|
| 3,298,906 | 1/1967 | Knowles . |
| 3,380,462 | 4/1968 | Schieber et al. . |
| 3,690,857 | 9/1972 | Blair, Jr. . |
| 3,713,784 | 1/1973 | Hess et al. . |
| 4,479,820 | 9/1983 | Merk et al. . |
| 4,851,583 | 7/1989 | Bockowski et al. ............. 568/465 |
| 5,022,428 | 6/1991 | Vilines . |
| 5,079,266 | 1/1992 | Bockowski et al. ............. 514/703 |
| 5,183,944 | 2/1993 | Werle et al. . |
| 5,243,082 | 9/1993 | Etzkorn et al. ............. 568/465 |
| 5,276,201 | 1/1994 | Haas et al. ............. 568/491 |
| 5,352,841 | 10/1994 | Werle et al. ............. 568/449 |

FOREIGN PATENT DOCUMENTS

| | | |
|---|---|---|
| 0087509 | 9/1983 | European Pat. Off. . |
| 1901758 | 8/1970 | Germany . |
| 4038471.3 | 6/1992 | Germany . |
| 2023123 | 12/1979 | United Kingdom . |
| WO84/03287 | 8/1984 | WIPO . |

*Primary Examiner*—Neil McCarthy
*Attorney, Agent, or Firm*—Beveridge, DeGrandi, Weilacher & Young

[57] ABSTRACT

Stretches of flowing water are doped with acrolein for the purpose of preventing excessive growth of plants and algae. In order to avoid transport of acrolein, acrolein is produced at the site where it is required by deacetalation of an acrolein acetal in the presence of an aqueous mineral acid. No electrical energy is necessary for this process. An acrolein acetal and an aqueous mineral acid solution are delivered from compression-proof storage tanks into a mixing chamber by the application of pressure from a pressure cylinder. The mixture is passed through a deacetalation reactor unit which includes a tubular reactor part and a container-shaped reactor part.

22 Claims, 2 Drawing Sheets

METHOD FOR TREATING WATER WITH ACROLEIN AND A DEVICE FOR THE PERFORMANCE THEREOF

BACKGROUND OF THE INVENTION

The invention relates to a method and a device for treating bodies of water, preferably flowing water in irrigation canals, with acrolein as a biocide. Acrolein is added in order to avoid algal growth and excessive growth of weeds in these bodies of water. In the method according to the invention, an acrolein acetal is used as a biocide precursor. The acrolein acetal is deacetalated in the device according to the invention. No electrical energy is required to operate the device.

In warm climatic zones where there are extensive fields and plantations under agricultural use, a large network of irrigation canals is maintained. In these canals, algal growth and excessive growth of weeds easily occur because of the presence of aquatic plants. The plants hamper the flow rate in the canals and impede the trouble-free action of the pumping stations necessary for operation. For this reason, it is customary to treat the water in such irrigation systems with a biocide.

Various biocides may be used for doping these stretches of flowing water. In practice, acrolein has proven to be particularly successful as a biocide.

Apart from its hitherto unsurpassed activity, acrolein also has an advantage over other biocides in that it undergoes degradation in water after a relatively short time. Acrolein is thereby no longer active as a biocide at the point of irrigation of the fields, but it is degraded into decomposition products that do not harm the physiology of plants.

Up to the present, the doping of water with acrolein has involved applying excess pressure on a storage tank filled with acrolein by means of a pressurized gas from a pressure cylinder and moving the acrolein through an ascending pipe from the storage tank directly into the irrigation canal. However, handling is risky because of the physical and chemical properties of acrolein. Acrolein is poisonous and highly toxic if inhaled, as well as pungent and lachrymatory. The product is easily flammable (flash point $-29°$ C., boiling point $53°$ C.), which creates handling problems in warm climatic zones. Furthermore, there is a danger of explosive polymerization reactions if the acrolein becomes contaminated with impurities.

In view of the risks described, which arise both during the transport and in the use of acrolein, there is a need to carry out doping with a biocide having comparable activity, but wherein the handling of the biocide is considerably less risky.

The hydrolysis of acrolein acetals, also including cyclic acrolein acetals, with the recovery of acrolein, is known from U.S. Pat. No. 4,851,583 (which patent is entirely incorporated herein by reference). Strongly acidic ion exchangers are used as catalysts. But the method described in this patent is unsuitable for doping stretches of flowing water, because it rapidly leads to the contamination or inactivation of the ion exchanger. Moreover, most acrolein acetals have only a very limited solubility in water, and, in addition, the rate of solution is low. For example, to prepare a solution of 2-vinyl-1,3-dioxolane (VDL) in water, which under practical conditions is almost saturated (approximately 8% by weight), it is necessary to stir for approximately 10 minutes with intimate mixing. At a water volumetric flow rate of 30,000 $m^3$/h and strong algal growth, for the purpose of adequate doping, 300 liters of VDL/h to 3750 liters water/h would have to be homogenized and then deacetalated. These factors have hitherto hampered the use of acrolein acetals for liberating acrolein in the large quantities which are necessary for the treatment of irrigation canals, in particular those having a high content of algae and aquatic plants, because under practical conditions, no electrical energy is available for the purpose of intimate mixing.

One method of doping water is described in German Patent Publication No. P 40 38 471 (which is also entirely incorporated herein by reference). According to the teaching of this publication, acrolein is formed by deacetalation of acrolein acetals in the aqueous phase in the presence of a strongly acidic catalyst. In this connection, an acrolein di-n-alkylacetal, wherein the alkyl groups contain 3 to 5 carbon atoms, or a cyclic acrolein acetal, wherein the alcohol components have 2 to 6 carbon atoms and 2 to 6, preferably 2 to 4, OH groups, is used. A strongly acidic ion exchanger or a mineral acid is used as a deacetalation catalyst. The method for doping aqueous solutions described in German No. P 40 38 471 is based on the principle that the acrolein formed during deacetalation in a reaction vessel is continuously removed from the aqueous phase and transferred into the aqueous solution which is to be doped. This transfer takes place either by means of a stream of gas which is passed through the reaction vessel and then conducted into the aqueous solution to be doped, or by using a liquid jet pump, wherein the pumping fluid is the aqueous solution to be doped. This method is in fact very suitable, for example, for doping cooling-water systems in industrial plants, but in practice, it cannot be used for doping stretches of flowing water such as water in irrigation canals, because the electrical energy which is necessary for operating the pumps is generally not available at the site where doping takes place. Doping stretches of flowing water with a biocide must be feasible in the "open field", where neither electrical energy nor chemically-trained technical staff are available to operate the appropriate devices.

SUMMARY OF THE INVENTION

One object of the present invention is to provide a method for treating bodies of water with acrolein which avoids the disadvantages of applying acrolein directly and is easier to perform than previously-known methods, by using an acrolein acetal as a biocide precursor. The method according to the invention is easy to use and does not depend upon the input of electrical energy for the operation of pumps or devices for stirring or heating. In addition, the treating device in accordance with another aspect of the invention is as simple as possible, sturdy, transportable and capable of being operated by untrained staff.

The method according to the invention relates to a process for treating bodies of water with acrolein, wherein acrolein is formed outside the stretch of water by deacetalation of an acrolein acetal having an alcohol containing from 1 to 4 carbon atoms and from 1 to 3 hydroxyl groups in an aqueous phase in the presence of a mineral acid, wherein:

a 25 to 95% by weight solution of the acrolein acetal in a solvent, and a 3 to 30% by weight aqueous mineral acid solution, each from compression-proof storage tanks, are compressed into a mixing chamber by application of pressure from a pressure cylinder, preferably an $N_2$ (nitrogen gas) steel cylinder, wherein the ratio of mixture into the inlet pipes of the mixing chamber is adjusted by means of metering devices so that the reaction mixture contains at least 1 mole of water and between 0.01 and 0.1 moles of mineral acid per mole of acrolein acetal.

The reaction mixture contained in the mixing zone first is led through a tubular reactor and then through a container-shaped reactor section of a deacetalation reactor unit.

The average residence time in the tubular reactor is at least 10 seconds, and the average residence time in the container-shaped reactor section is at least 2 minutes.

From the container-shaped reactor, a reaction mixture emerges which passes into the stretch of flowing water which is to be doped.

The device according to the invention, a preferred embodiment of which is shown in FIG. 1, for carrying out the method according to the invention, includes a deacetalation reactor unit (14) and (15), and one storage tank, respectively, for each of a solution containing acrolein acetal (1) and an aqueous mineral acid solution (2). The storage tanks (1) and (2) are of a compression-proof construction and are connected to a pressure cylinder (3). Pressure cylinder (3) is equipped with a pressure-controlling device (4) for the purpose of building up pressure. Product pipes (7) and (8), each having a metering device, (9) and (10), respectively, lead out of the storage tanks (1) and (2) into a mixing chamber (11), wherein the mixing chamber is situated in front of or at the inlet area of the deacetalation reactor unit. The deacetalation reactor unit includes a tubular reactor part (14) and a second container-shaped reactor part (15), wherein the outlet (17) of the deacetalation reactor is connected to a pipe (17a) leading to a point beneath the surface of the stretch of water to be doped.

BRIEF DESCRIPTION OF THE DRAWINGS

The method according to the invention can be carried out in a straightforward manner using the device described below in conjunction with the attached figures, wherein.

DETAILED DESCRIPTION OF THE INVENTION

Figure 1:
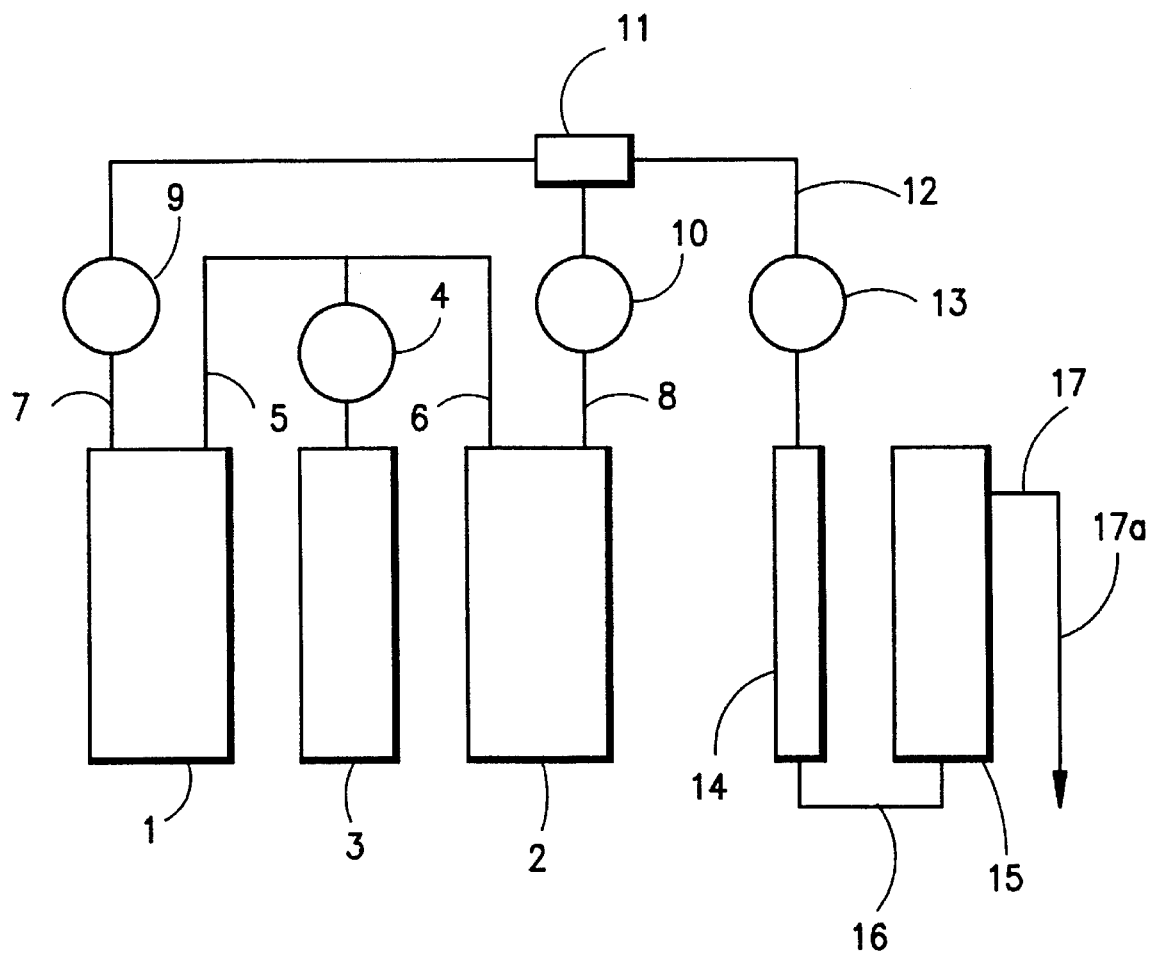
FIG. 1 shows a block diagram of one preferred embodiment of the system for doping stretches of flowing water.

The problems previously described above with respect to the known methods are eliminated by the method according to the invention and the device according to the invention for performing the method. Even large and highly contaminated stretches of flowing water, such as irrigation canals, can be treated effectively at low technical expense.

The acrolein acetals to be used in the process according to the invention are those having (i) monovalent ($C_1$-to $C_4$-) alcohols, such as methanol, ethanol, propanols and butanols; (ii) divalent ($C_2$-to $C_4$-) alcohols, such as ethylene glycol, 1,2-propylene glycol, 1,3-propylene glycol and butanediol; and (iii) trivalent alcohols, such as glycerol and trihydroxybutane. Acetals having an alcohol component of type (i) and (ii) above are sparingly soluble in water, while those having an alcohol of type (iii) are more soluble. Acrolein acetals having a 2-vinyl-1,3-dioxolane structure or 2-vinyl-1,3-dioxane structure are preferably used. The 2-vinyl-1,3-dioxolane (VDL), which is readily obtainable from acrolein and ethylene glycol, is particularly preferred.

Solutions of acrolein acetal are used in accordance with the invention. The quantity and selection of the solvent are chosen so that, after addition of an aqueous mineral acid and transport of the reaction mixture through the tubular part of the reactor in the device according to the invention, separation no longer occurs and the deacetalation can go to completion in the container-shaped reactor.

Organic solvents which are completely soluble in water, such as lower alcohols, lower ketones and bipolar solvents, are suitable as solvents for acrolein acetals which are partially soluble in water. Mixtures of two or more solvents may be used. Monovalent $C_1$-to $C_4$-alcohols, especially isopropanol, are particularly preferred organic solvents.

Surprisingly, ethylene glycol is not very suitable as a solvent for VDL in the method according to the invention. Water and/or the aforementioned solvents are suitable as solvents for the acrolein acetals that are more water-soluble. Where organic solvents are used, the quantity of solvent is minimized for reasons of cost. It is appropriate for the solution to contain at least 50% by weight, preferably at least 80% by weight of the acrolein acetal. Moreover, the upper limit of the acetal content is dependent upon the solubility of the acetal after the desired residence time of the reaction mixture in the tubular part of the reactor. The acetal content is preferably as high as possible, and in favorable cases, it may reach from 90 to 95% by weight. In the case of 2-vinyl-1,3-dioxolane, the solution preferably contains isopropanol as solvent and has an acetal content of from 80 to 90% by weight.

As a mineral acid, sulfuric acid is preferable to hydrochloric acid, nitric acid and phosphoric acid. The concentration of acid in the aqueous solutions to be used is from 3 to 30% by weight, preferably from 5 to 20% by weight. The quantity of water required for the deacetalation, namely at least 1 mole, preferably at least 2 moles of water per mole of acetal, is generally introduced into the reaction mixture at the same time as the aqueous acid solution. The quantity of mineral acid used per mole of acrolein acetal is generally in the range of between 1 and 30 mol-%, preferably between 2 and 10 mol-% and in particular between from 3 to 7 mol-%.

The use of a deacetalation reactor unit having an initial tubular part and a second container-shaped part has been found to be essential in order to obtain a homogeneous reaction mixture. A homogenous reaction mixture is necessary if a sufficiently rapid deacetalation is to be achieved. Unless a large quantity of solvent is present, the reaction mixture, comprising an acrolein acetal, water, solvent and mineral acid, is generally not homogeneous, but in two-phases immediately after the acetal solution and the mineral acid solution have been brought into contact. An adequate blending of all the components with partial reaction takes place in the tubular part of the reactor, without the separation which would occur in container-shaped reactors not having a mixing device. The reaction mixture is largely homogeneous after it has been passed through the tubular part of the reactor.

The reaction time in the tubular reactor is adjusted to be from at least 10 seconds to approximately 60 seconds, and preferably from 20 to 40 seconds. Separation is advantageously counteracted by the use of a helical tubular reactor as the tubular part of the reactor, a vertical arrangement of the helix and a downward direction of the flow. A longer tubular reactor and/or a longer reaction time in the first part of the reactor is necessary in the case of reaction mixtures which separate easily. The reaction time in the second container-shaped part of the reactor is at least 2 minutes. The reaction time is preferably between 3 and 30 minutes, in particular between 5 and 20 minutes.

Proper adjustment of the residence time in the first and second parts of the reactor is essential for a good yield of acrolein. As already mentioned, the residence time is dependent upon the solubility and rate of solution of the acrolein acetal and the molar ratios of acetal to water and of acetal to mineral acid. Those skilled in the art will optimize the operating conditions by means of preliminary tests and routine experimentation. An excessively long reaction time in the container-shaped reactor should be avoided, because it may lead to an undesirable polymerization of acrolein.

The reaction mixture leaving the deacetalation reactor is led directly into the stretch of water to be doped. During this introduction into the stretch of water, there is rapid and essentially complete hydrolysis of the acrolein acetal which may still not have reacted or not completely reacted, so that yields of acrolein of more than 99% are obtained, based on the amount of acetal used.

In order to adjust the residence time of the reaction mixture in the tubular reactor, it is useful to equip the end of the tube with a nozzle, for example an apertured diaphragm, having a desired diameter, conventionally between 0.5 and 5 mm. In this manner, the pressure in the reactor may be regulated, and thereby the rate of flow and the residence time may be regulated by means of a serially-connected device (such as a control valve) for fine control of the operating pressure. In this case, the admission pressure on the storage tanks is greater than the operating pressure in the reactor. The residence time of the reaction mixture in the two parts of the reactor unit is also dependent, of course, on the dimensions of the container-shaped reactor. For example, the residence time in the container-shaped reactor can be reduced by lowering the level of the outlet or by introducing displacers into the reactor.

The dosage level of the acrolein-containing reaction mixture which leaves the reactor and is introduced into the stretch of flowing water to be doped depends upon the quantity of flow ($m_3$/h), the extent of the excessive weed and algal growth, and the rate of regeneration of the weeds and algal growth. In practice, doping is conducted either over a period of time, for example, 24 hours continuously at a low dosage, or for only a few hours each day at a correspondingly higher dosage. The dosage of acrolein in doped water is generally within the range of between 0.1 and 20 ppm (parts per million, here ml/$m_3$). In 24-hour doping, an acrolein dosage of from 0.1 to 1 ppm is usually applied, whereas in doping, for example, for a three hour period, a dosage of from 1 to 20 ppm, preferably from 2 to 10 ppm, is used. The required quantity of acrolein acetal to be used is calculated from the desired acrolein dosage. Because the yield of acrolein is virtually quantitative, 1 mole of acrolein corresponds to 1 mole of acrolein acetal.

The entire device in accordance with the invention, as illustrated in FIG. 1, can be transported as a mobile unit, such as on a truck, lorry or the like, and requires no electrical energy for its operation. Typical pick-up trucks may be used to carry the device in accordance with the invention. The device in FIG. 1 essentially comprises one storage tank, respectively, for each of the acrolein acetal solution (1) and the aqueous mineral acid solution (2), a pressure cylinder (3) equipped with a pressure-controlling device (4), pressure pipes (5) and (6) connected to the storage tanks (1) and (2), and product pipes (7) and (8) from the tanks (1) and (2) to the mixing chamber (11), wherein each product pipe (7) and (8) is provided with a metering device (9) and (10), respectively. The storage tanks (1) and (2) may be of any size, such as 100 to 1000 liter tanks. A pipe (12) for the reaction mixture leads from the mixing chamber (11) to the reactor unit. A device, such as a valve (13), is provided for fine adjustment of the flow into the deacetalation reactor unit, which unit includes a tubular reactor part (14) and a container-shaped reactor part (15) connected in series, and completely independent of one another. A passage (16) is provided between the two parts (14) and (15) of the reactor unit, and an outlet pipe (17) from the container-shaped reactor part (15), which connects to a pipe (17a), leads into the stretch of water to be doped. The average residence time in the tubular reactor section (14) is at least 10 seconds, and the average residence time in the container-shaped reactor section (15) is preferably at least 2 minutes.

The compression-proof storage tanks (1) and (2) are commercially available tanks which are capable of withstanding the pressure used in the system (typically about 3 bars). The tanks (1) and (2) also must be capable of withstanding deterioration from the chemicals to be stored therein. Stainless steel kegs may be used to store sulfuric acid. The VDL cylinder also may be made from stainless steel.

The pressure-controlling device (4) of the pressure cylinder (3) incorporates devices for opening and closing the pressure cylinder (3) and for reading off the cylinder pressure and the operating admission pressure which has been established. Such pressure controlling devices (4) are conventional, commercially available, and well known in the art.

The metering devices (9) and (10) are conventional, commercially available devices for establishing a given flow. They can, for example, be a metering valve combined with a rotameter. However, a combination of an apertured diaphragm with a check valve (i.e., non-return valve) is preferably used for the metering devices (9) and (10), wherein the apertured diaphragm to be used is selected or adjusted to facilitate the required flow. The apertured diaphragm is a plate with an aperture mounted within a pipe for regulating the flow. Small apertures result in low flow rates, and larger apertures increase flow rate, assuming the pressure remains constant. The ratio of mixture of the acrolein acetal solution to the aqueous mineral acid solution can be adjusted to a constant predetermined optimum value by selecting the diameter of the holes in the apertured diaphragm in metering device (9) on one side and/or metering device (10) on the other. Such metering devices and non-return valves are conventional and commercially available.

The mixing chamber (11) is the point at which the flow of products from the pipes (7) and (8) are brought into contact and mixed for the first time. The products from pipes (7) and (8) are usefully brought together in a manner that enables the best possible mixture of the solutions to take place. Generally, a simple junction between the pipes (7) and (8) is a suitable mixing chamber (11); however, static mixing baffles also may be present. The mixing chamber (11) can also be integrated into the tubular part (14) of the reactor, if desired.

To the extent that the flow through the reactor is not rigidly controlled by the pressure-controlling device (4) and the metering devices (9) and (10), it can be regulated to the actual requirements by means of a device (13) for fine adjustment of the flow. Such devices (13) are conventionally constructed in the form of a metering valve combined with a pressure gauge (or manometer), as is known in the art. In practice, the flow can be determined without using flowmeters. For the ratio of the mixture of solutions from the storage tanks (1) and (2), which is established by the apertured diaphragms in metering devices (9) and (10), the flow can be read from a previously constructed calibration curve in which the operating pressure is plotted against the flow of the reaction mixture, or, as the case may be, from the flow of the acrolein acetal solution and the corresponding acrolein.

The reaction mixture first flows through a tubular reactor (14) and then through a container-shaped reactor (15). The tubular reactor (14) typically may have a volume of about 2 liters, and the container-shaped reactor section (15) typically may have a volume of about 20 liters. However, the volumes of the reactors may depend on the amount of VDL (l/h) to be hydrolyzed. Using the 2 and 20 liter reactors as mentioned above, the VDL stream could be regulated to be between about 10–40 gallons/hour. One skilled in the art would be able to determine the necessary reactor volumes and/or flow rates through routine experimentation.

Figure 2:
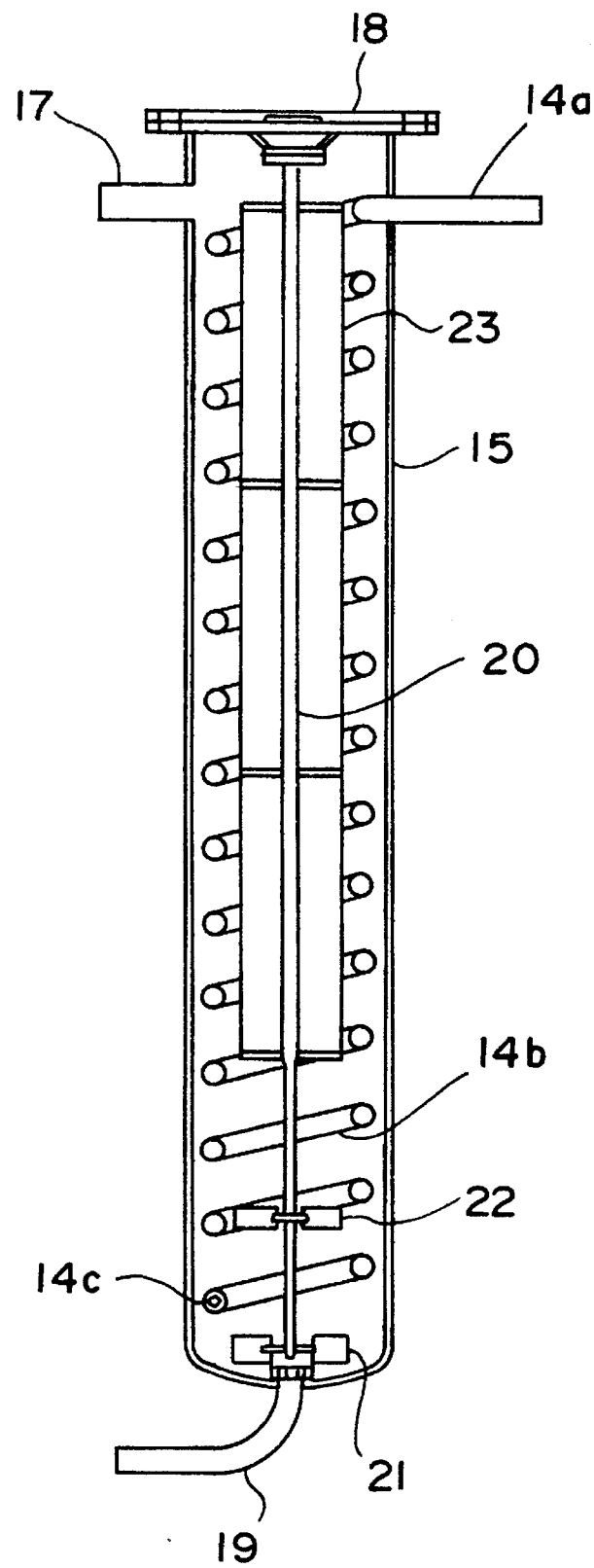
FIG. 2 shows a longitudinal section of a preferred embodiment of a deacetalation reactor unit, wherein the tubular part of the reactor is positioned within the container-shaped part of the reactor.

The passage (16) between tubular reactor (14) and container-shaped reactor (15) may be any pipe connection. Alternatively, in embodiment of the reactor unit according to FIG. 2, the passage (16) may be omitted. The tubular part (14) of the reactor unit can, for example, be constructed in the form of a packed column or, most preferred, in the form of a meandering or helically arranged tube, as illustrated in FIG. 2. Inert mineral matter such as that which is used in distillation columns, is suitable as packing for a packed column. The deacetalation begins in the tubular part (14) of the reactor unit, wherein the mixture is largely homogeneous at the end of this part of the reactor so that it no longer separates out in the container-shaped portion (15) of the reactor unit, even when the flow is slower and the deacetalation can go to completion. The container-shaped part (15) of the reactor unit may be in any form. The inlet for the reaction mixture in container-shaped reactor part (15) is generally positioned at the lower end thereof, and the outlet (17) to the stretch of water to be doped is generally in the upper part of the container-shaped reactor part (15).

The spatial arrangement of the two reactor parts (14) and (15) is per se arbitrary. The reactor parts (14) and (15) may be side by side, one upon the other or inside one another. FIG. 2 illustrates a particularly advantageous and compact embodiment of the reactor unit. The tubular part (14) of the reactor unit is positioned inside the container-shaped part (15) of the reactor unit. These two reactor parts (14) and (15) are connected in series even though the tubular part (14) is contained within the container-shaped reactor part (15). The reaction mixture enters at the inlet (14a) of the tubular reactor part (14), proceeds into coiled tubing (14b) and leaves the coil tubing (14b) through a nozzle (14c). The coiled tube (14b) is preferably arranged vertically, and the reaction mixture preferably flows from top to bottom. A tangential flow is achieved through the nozzle (14c) at the end of the helix, and this gives rise to blending of the mixture newly entering the container-shaped part (15) of the reactor unit with the reaction mixture that is already there. The volume of the tubular reactor part (14) is generally far smaller than that of the container-shaped part (15). The deacetalated reaction mixture leaves the container-shaped reactor part (15) through the outlet pipe (17), which is connected with a pipe (not shown in FIG. 2) leading into the stretch of water to be doped.

In the embodiment shown in FIG. 2, the nozzle (14c) is arranged so that the flow passing out of the coiled tubing (14b) drives a turbine wheel (21) installed on an axis (20). Paddle mixers arranged along the axis (20) make further blending possible. If required, displacers (23) can be introduced through the cover (18) of the reactor unit into the container-shaped reactor part (15), in order to reduce the volume of the container-shaped reactor part (15), to thereby shorten the residence time therein. A second reactor outlet (19), which may be equipped with a valve (not shown in FIG. 2), serves as an outflow or drain from the reactor. The items designated by the reference numbers (20) to (23) are optional facilities which are required only in exceptional cases.

The advantages of the device according to the invention lie in its simple construction and straightforward handling. The device requires no expensive control system, it can be assembled and dismantled without difficulty, and it can be easily transported, so that it can be operated at many different sites.

EXAMPLE

An irrigation canal having a water flow rate of 10,200 $m_3/h$ and an average growth of algae and plants is treated with acrolein produced from deacetalation of 2-vinyl-1,3-dioxolane (VDL) as a biocide, using a device according to FIG. 1 having a reactor unit design according to FIG. 2.

Required dosage of acrolein=3.1 $ml/m^3$

Duration of dosage=3 hours

The acrolein acetal solution to be used consists of 80% by volume of VDL and 20% by volume of isopropanol (which corresponds to 83.6 and 16.4% by weight, respectively). A 10% by weight aqueous sulfuric acid solution is to be used for the deacetalation catalyst. The apertured diaphragms in the metering devices (9) and (10) are selected so that the ratio of the mixture of acetal solution to mineral acid solution is 1 to 0.36. The nozzle (14c) has a diameter of 1.5 mm. At the required dosage of acrolein, the flow is adjusted by means of the device for adjusting flow (13) in such a way that 80 liters of reaction mixture leaves the reactor per hour (corresponding to 58.8 l/h of VDL solution and 21.2 l/h of sulfuric acid solution). The admission pressure from the pressure cylinder is 3 bar; the operating pressure for the required flow is found from a calibration curve to be 1.034 bar, and the flow rate is adjusted by means of the metering device (13).

As a result of treating a body of water in accordance with the invention, using the device in accordance with the invention, algal and aquatic plant growth decreases in the body of water.

Those skilled in the art will appreciate that various changes and modifications may be made without departing from the spirit and scope of the invention, as defined in the appended claims.

The priority application, German Patent Appl. No. P 43 26 575.8, filed in Germany on Aug. 7, 1993, is relied on and entirely incorporated herein by reference.

| List of reference symbols to the FIGS. 1 and 2 | |
|---|---|
| 1 | Compression-proof storage tank (for acrolein acetal solution) |
| 2 | Compression-proof storage tank (for aqueous mineral acid solution) |
| 3 | Pressure cylinder |
| 4 | Pressure-controlling device |
| 5 | Pressure pipe to storage tank 1 |
| 6 | Pressure pipe to storage tank 2 |
| 7 | Product pipe from storage tank 1 |
| 8 | Product pipe from storage tank 2 |
| 9 | Metering device in pipe 7 |

-continued

List of reference symbols to the FIGS. 1 and 2

| 10 | Metering device in pipe 8 |
|---|---|
| 11 | Mixing chamber |
| 12 | Pipe for the reaction mixture from mixing chamber 11 to the reactor unit |
| 13 | Device for adjusting flow |
| 14 | Tubular reactor part |
| 14a | Inlet to tubular reactor part 14 |
| 14b | Coiled tubing |
| 14c | Nozzle |
| 15 | Container-shaped reactor part |
| 16 | Passage between reactor parts 14 and 15 |
| 17 | Outlet pipe from container-shaped reactor part 15 |
| 17a | Pipe leading into the stretch of water to be doped |
| 18 | Reactor cover for container-shaped reactor part 15 |
| 19 | Reactor outlet from container-shaped reactor part 15 |
| 20 | Turbine axis |
| 21 | Turbine blade |
| 22 | Paddle mixer |
| 23 | Displacer |

We claim:

1. A method for treating a body of water with acrolein, comprising:

forming acrolein outside a stretch of water by deacetalation of an acrolein acetal having an alcohol containing from 1 to 4 carbon atoms and from 1 to 3 hydroxyl groups in an aqueous phase, wherein the deacetalation takes place in the presence of a mineral acid, wherein the acrolein is formed by mixing a 25 to 95% by weight solution of the acrolein acetal in a solvent, and a 3 to 30% by weight aqueous mineral acid solution, in a mixing chamber to provide a reaction mixture, wherein the acrolein acetal solution and the mineral acid solution are supplied to the mixing chamber from compression-proof storage tanks, by application of gas under pressure from a pressure cylinder, wherein the ratio of the acrolein acetal solution and the mineral acid solution in the reaction mixture is adjusted by metering devices such that the reaction mixture contains at least 1 mole of water and between 0.01 and 0.1 moles of mineral acid per mole of acrolein acetal, wherein the reaction mixture is first passed through a tubular reactor section and then through a container-shaped reactor section of a deacetalation reactor unit, wherein an average residence time in the tubular reactor section is at least 10 seconds and an average residence time in the container-shaped reactor section is at least 2 minutes, and passing the reaction mixture emerging from the container-shaped reactor section into the body of water which is to be treated.

2. A method according to claim 1, wherein the acrolein acetal is 2-vinyl-1,3-dioxolane, the solvent for the acrolein acetal is a monovalent alcohol having 1 to 4 carbon atoms, and the acrolein acetal solution contains from 50 to 90% acrolein acetal by weight.

3. A method according to claim 1, wherein the acrolein acetal solution is an 80 to 90% by weight solution of acrolein acetal in isopropanol.

4. A method according to claim 1, wherein the mineral acid is sulfuric acid in the form of a 5 to 20% by weight aqueous solution.

5. A method according to claim 1, wherein the reaction mixture includes from 3 to 7 mol-% of sulfuric acid, and the reaction mixture further includes from 2 to 2.5 moles of water per mole of 2-vinyl-1,3-dioxolane.

6. A method according to claim 1, wherein the body of water being treated is a flowing body of water, and algal growth and weed growth in the body of water is reduced.

7. A method for treating a body of water with acrolein, comprising:

mixing a 25 to 95% by weight solution of acrolein acetal in a solvent with a 3 to 30% by weight aqueous mineral acid solution, wherein the acrolein acetal solution and the aqueous mineral acid solution are mixed together by applying a gas under pressure to thereby form a reaction mixture which contains at least 1 mole of water and between 0.01 and 0.1 moles of mineral acid per mole of acrolein acetal;

passing the reaction mixture through a tubular reactor section and then through a container-shaped reactor section of a deacetalation reactor unit to thereby form acrolein outside a body of water to be treated; and passing the reaction mixture emerging from the container-shaped reactor section into the stretch of water which is to be doped.

8. A method according to claim 7, wherein the acrolein acetal includes an alcohol containing from 1 to 4 carbon atoms and from 1 to 3 hydroxyl groups in an aqueous phase.

9. A method according to claim 7, wherein an average residence time of the reaction mixture in the tubular reactor section is at least 10 seconds.

10. A method according to claim 9, wherein an average residence time in the container-shaped reactor section is at least 2 minutes.

11. A method according to claim 7, wherein an average residence time in the container-shaped reactor section is at least 2 minutes.

12. A method according to claim 7, wherein the acrolein acetal is 2-vinyl-1,3-dioxolane.

13. A method according to claim 12, wherein the solvent for the acrolein acetal is a monovalent alcohol having 1 to 4 carbon atoms.

14. A method according to claim 13, wherein the acrolein acetal solution contains from 50 to 90% by weight acrolein acetal.

15. A method according to claim 7, wherein the acrolein acetal solution is an 80 to 90% by weight solution of acrolein acetal in isopropanol.

16. A method according to claim 7, wherein the mineral acid is sulfuric acid in the form of a 5 to 20% by weight aqueous solution.

17. A method according to claim 7, wherein the reaction mixture includes from 3 to 7 mol-% sulfuric acid, and the reaction mixture further includes from 2 to 2.5 moles of water per mole of 2-vinyl-1,3-dioxolane.

18. A method according to claim 7, further comprising storing the acrolein acetal solution and the mineral acid solution in separate compression proof storage tanks prior to mixing.

19. A method according to claim 7, wherein the acrolein acetal solution and the mineral acid solution are mixed in a mixing chamber.

20. A method according to claim 7, wherein the gas under pressure is stored in a pressurized cylinder.

21. A method according to claim 7, further comprising the step of controlling the amounts of the mineral acid solution and the acrolein acetal solution in the mixing step by metering devices.

22. A method according to claim 7, wherein the body of water is a flowing body of water.

* * * * *